Oct. 24, 1961     C. F. VARN     3,005,598
DEVICE FOR FEEDING PLASTIC MATERIAL TO AN EXTRUDER
Filed Aug. 28, 1956     2 Sheets-Sheet 1
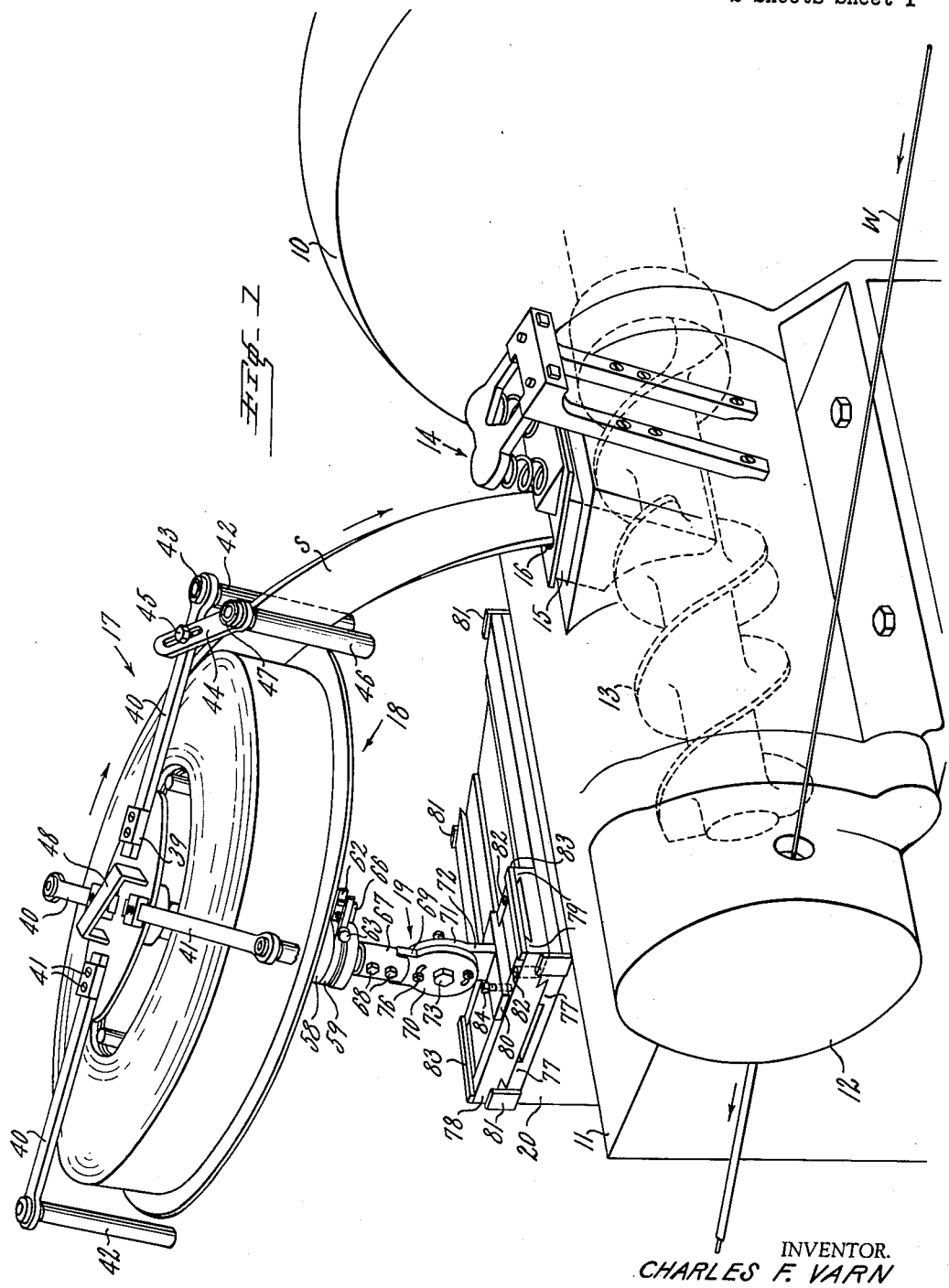
INVENTOR.
CHARLES F. VARN
BY
ATTORNEY Oct. 24, 1961  C. F. VARN  3,005,598
DEVICE FOR FEEDING PLASTIC MATERIAL TO AN EXTRUDER
Filed Aug. 28, 1956  2 Sheets-Sheet 2
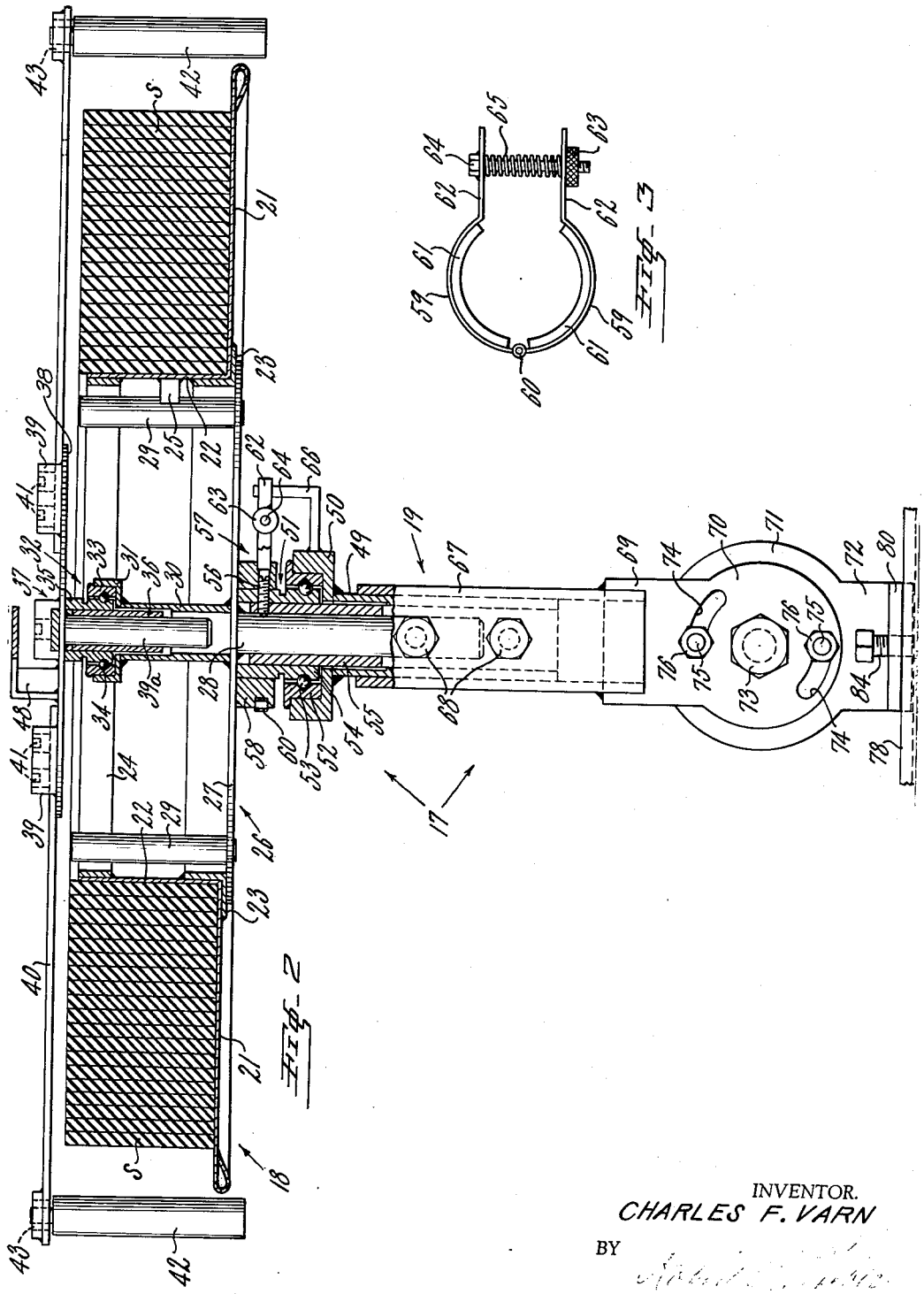
INVENTOR.
CHARLES F. VARN
BY
ATTORNEY United States Patent Office 3,005,598
Patented Oct. 24, 1961

3,005,598
DEVICE FOR FEEDING PLASTIC MATERIAL
TO AN EXTRUDER
Charles F. Varn, Staten Island, N.Y., assignor to United States Rubber Company, New York, N.Y., a corporation of New Jersey
Filed Aug. 28, 1956, Ser. No. 606,724
3 Claims. (Cl. 242—68)

This invention relates to a device for feeding a continuous strip of plastic material to the intake opening of an article forming apparatus such as the feed slot of an extruder.

In conventional practice, it is customary to wind the strip of plastic material to be extruded on a reel, and this reel is ordinarily rotatably mounted on a stand adjacent the extruder so that the reel axis is substantially vertical. The strip is then unwound and fed by hand into the intake opening of the extruder, whereupon it is gripped and fed to the extruding die by the feed screw. Great care must be continuously taken by the operator in feeding the strip to the extruder because the plastic material (usually uncured natural or synthetic rubber or the like) will flow readily and is thus too weak to withstand a strong pull without stretching or breaking. With the reel axis substantially vertical, a strong pull is necessary to overcome the inertia of the heavy reel and strip thereon. Thus, the strip often stretches, resulting in inadequate feeding of the extruder, and frequently breaks, which of course, stops the extrusion operation entirely. An attempt to overcome this difficulty by positioning the reel axis in a substantially horizontal position has not proved successful either, because the soft, plastic material flows and droops into an oval shape eccentric to the reel axis. As a consequence, an even stronger pull is necessary to unwind the strip, thereby increasing the tendency of the strip to stretch and break.

Moreover, even if the operator is fortunate enough not to stretch or break the strip in feeding it to the extruder, he must be careful to prevent the reel from free-wheeling and over-feeding the strip. This often occurs when the strip is subjected to a sudden, strong pull, thereby spinning the reel and resulting in fouling of the strip, as well as possible contamination thereof by foreign particles on the floor.

Accordingly, it is an object of this invention to provide a device for feeding a continuous strip of plastic material to the intake opening of an article forming apparatus such as the feed slot of an extruder, which device is so constructed and arranged that the reel is properly positioned vertically of, in alignment with and horizontally of the intake opening; the axis of the reel is properly positioned angularly between a horizontal and vertical position; the rotation of the reel is controlled to feed the strip to the intake opening at the desired rate, and the material is guided from the reel to the intake opening; thereby eliminating the manual labor and avoiding each of the aforesaid, as well as other deficiencies found in the prior art.

Other objects and advantages of the invention will become apparent upon a consideration of the following specification and claims when read in conjunction with the accompanying drawings, wherein:

FIG. 1 is a perspective view of a feeding device constructed in accordance with the teachings of the invention and illustrates the manner in which it feeds an extruder;

FIG. 2 is an elevational view of a portion of the feeding device, including the reel and stand, as well as the rotatable reel support, brake and strip guide, with certain parts being broken away in section; and FIG. 3 is a plan view of a portion of the brake shown in FIG. 2.

Referring to FIG. 1, there is shown a conventional cross-head extruder 10 having a block 11 with a barrel 12 in which is rotatably mounted a feed screw 13 for extruding suitable plastic material, such as natural or synthetic rubber or the like, through a die (not shown) and around a wire W to form the insulation and/or jacket therefor. The extruder 10 is provided with a feeding mechanism 14 comprising a yieldably pressed feed block or plunger 15 having a feed slot 16 for the reception of a flat strip S of the plastic material, which strip is gripped and fed to a die (not shown) by the rotating feed screw 13 for the extrusion operation. The detailed construction and operation of feeding mechanism 14 is described in copending application, Serial No. 606,871, filed August 29, 1956, now Patent No. 2,947,030, and forms no part of the present invention.

The feeding device 17 embodying the present invention, is particularly adapted for feeding the strip S, which has a rectangular cross-section as shown in FIG. 2, to the feed slot 16 in the proper manner and at the desired rate. The feeding device 17 basically comprises a reel 18 for carrying the coiled strip S, a stand 19 for rotatably supporting the reel and a base 20 for supporting the stand.

As also seen in FIG. 2, the reel 18 comprises an annular, radial plate 21 and hub 22 reinforced at their juncture by an annular angle iron 23, the hub being reinforced at its free end by a flat ring 24, and provided with one or more lugs 25 extending radially inwardly therefrom. The reel 18 is rotatably mounted on stand 19 which is provided with a rotatable reel support 26 for unwinding strip S and feeding it to feed slot 16 in feed block 15 of extruder 10.

Referring to FIG. 2, the rotatable reel support 26 comprises in part a circular plate 27 having a central, depending shaft 28 which is mounted in stand 19 for rotation, as will be described more in detail below. Adjacent its outer periphery, plate 27 is provided with a plurality of upstanding dowel pins 29, one or more of which are engageable with lug(s) 25 on hub 22 of reel 18 to prevent the reel from rotating relative to its support 26. Extending upwardly from plate 27, opposite shaft 28 is a central sleeve 30 having an annular seat 31 at its upper end for supporting a bearing 32 comprising an outer race 33 press fit into seat 31 for rotation therewith, a plurality of ball bearings 34 and a relatively stationary inner race 35 with a sleeve 36 press fit therein but extending freely into sleeve 30, to permit relative rotation therebetween.

In the particular embodiment illustrated, the strip guide 37 is rotatably mounted on the reel support 26, but is held substantially stationary in its operative position by the strip S. The guide comprises a circular plate 38 having a central depending shaft 39a slidably, but snugly mounted in sleeve 36 to prevent relative rotation therebetween, under normal conditions. Adjacent its outer periphery, plate 38 is provided with a plurality of circumferentially spaced, inverted U-shaped locks 39 in which a plurality of radially extending guide arms 40 are adjustably mounted by means of set screws 41. At their outer ends, each of arms 40 is provided with a downwardly depending guide roller 42 rotatably mounted therein by means of a bearing 43. On one of arms 40, another guide arm 44 is adjustably mounted by means of a set screw 45. Arm 44 is also provided with a downwardly depending guide roller 46 rotatably mounted therein by means of a bearing 47. In addition, plate 38 is provided with a handle 48 so that the whole strip guide 37 can be readily removed to permit quick and easy changing of the reels 18.

As will be apparent, when the reel 18 and its support 26 are rotating, the strip guide 37 will remain relatively stationary so that the strip S will be unwound from reel 18 and fed between guide roller 46 and adjacent guide roller 42 to slot 16, as shown in FIG. 1. These rollers are alignable transversely with slot 16 for optimum feeding of strip S to the slot, as will be pointed out more in detail below. If, for any reason, the strip S "backs up," i.e., does not feed properly to feed screw 13 in extruder 10, it will be prevented from falling off reel 18 and becoming fouled by the other guide rollers 42 on arms 40 which can be adjusted to position the rollers close enough to the outer periphery of plate 21 of reel 18 for this purpose, without interfering with the rotation thereof. Likewise, arms 40 can be readily adjusted for reels of various sizes, while arm 44 is adjustable on one of arms 40 for feeding and guiding strips of various thicknesses. It will also be noted that the reel support 26 is so proportioned and the guide 37 so mounted thereon that strips of various widths can readily be accommodated thereby.

Referring back to FIG. 2, stand 19 is provided with a sleeve 49 having a seat 50 at its upper end for supporting a bearing 51 comprising a stationary outer race 52 press fit in seat 50, a plurality of ball bearings 53 and a rotatable inner race 54 with a sleeve 55 press fit therein but extending freely into sleeve 49 to permit relative rotation therebetween. The shaft 28 of reel support 26 is slidably removable from sleeve 55, but in operation, is fixed thereto for rotation therewith by means of one or more set screws 56; thus the inner race 54 and sleeve 55 also form a part of the rotatable reel support 26.

In order to control the rotation of reel 18, the feeding device 17 is provided with a brake 57 comprising a brake drum 58 press fit on inner race 54 for rotation therewith and a pair of adjustable brake shoes 59 for applying pressure against drum 58. The brake drum 58 is bored to permit access to set screws 56 for facilitating adjustment thereof during insertion or removal of shaft 28. As also seen in FIG. 3, the brake shoes 59 are hinged at 60, and provided with linings 61 for frictional engagement with drum 58, as well as extensions 62 which are held in adjustable spaced relationship by means of nut 63 and bolt 64 surrounded by compression spring 65. To prevent brake shoes 59 from rotating with drum 58, bearing seat 50 is provided with an L-shaped stop 66 for engagement with either of extensions 62.

As will be evident, the readily adjustable brake 57 provides an effective means of controlling the rotation of reel 18 and its support 26 so that strip S will be fed to slot 16 at the desired rate by eliminating free-wheeling of the reel, as encountered in prior art practice. Thus, the undesirable effects of such reel free-wheeling, for example, over-feeding, fouling and contamination of the strip are completely avoided.

Continuing the description of the stand wtih reference to FIG. 2, sleeve 49 is slidably mounted in an outer sleeve 67, but in operation is fixed therein by means of set screws or bolts 68 passing through sleeve 67 and engaging the outer surface of sleeve 49. At its lower end, sleeve 67 is bifurcated for receiving the extension 69 of a pivotal disc 70 which extension is welded to sleeve 67. As also seen in FIG. 1, disc 70 is supported in engagement with a relatively stationary disc 71 having an extension 72 by means of a bolt 73 and nut (not shown). Disk 70 is provided with a pair of arcuate slots 74 through which studs 75 on disc 71 project, and disc 70 is held in the desired angular position by nuts 76 on studs 75.

It will now be apparent, that stand 19 is readily adjustable for properly positioning reel 18 vertically of feed slot 16. Merely by adjusting set screws 68, sleeve 49 can easily be raised or lowered in sleeve 67 to locate reel 18 at the proper vertical distance from slot 16 so that the strip S, which is turned substantially 90° from its position between rollers 42 and 46 to be aligned with slot 16, will only twist gradually and will not sag on its way to the slot, and so that there will be sufficient clearance between extruder 10 and both reel 18 and strip guide 37. Likewise, it will be apparent that stand 19 is readily adjustable for properly positioning the axis of reel 18 angularly between a horizontal and vertical position. Merely by adjusting nuts 76, disc 70 can easily be pivoted on bolt 73 relative to disc 71 to locate the axis of reel 18 at the proper angle between a horizontal and vertical position so that strip S will easily unwind from the reel and be fed to slot 16 without drooping on the reel, and without stretching, sagging or breaking between the reel and the feed slot. It has been found in practice that an angle of 60° to 70° inclusive, produces the most satisfactory results.

Referring now to FIG. 1 particularly, the base 20 for supporting stand 19 and the means for mounting the stand on the base will be described. The base 20 is preferably rigidly secured to the block 11 of the extruder 10 so that the upper horizontal surfaces of each are substantially flush, as shown. The mounting means preferably comprises dovetail ways 77 on base 20 extending longitudinally of extruder 10 and feed slot 16, a dovetail, longitudinal slide 78 movable therein and having dovetail ways 79 extending transversely of extruder 10 and feed slot 16, and a dovetail, transverse slide 80 movable in ways 79 and rigidly secured to extension 72 on disc 71 of stand 19. At each end, ways 77 are provided with stops 81 for limiting the movement of slide 78 which may be adjustably positioned in ways 77 by means of set screws 82. Likewise, ways 79 are provided with stops 83 at each end for limiting the movement of slide 80 which may be adjustably positioned in ways 79 by means of one or more set screws 84

As will become apparent, the stand 19 is thus adjustably mounted on base 20 for properly positioning reel 18 in alignment with and horizontally of feed slot 16. The function of ways 77 and slide 78 is to locate reel 18 in the proper alignment with slot 16, while the function of ways 79 and slide 80 is to position the reel at the proper horizontal distance from the slot. These adjustments are important for a number of reasons.

First, by adjusting slide 78 in ways 77 reel 18 can be aligned with slot 16 so that the mid-point between the inner and outer peripheries of the coiled strip S is aligned transversely with the mid-point of the slot. As noted above, adjacent rollers 42, 46 on strip guide 37 can also be aligned transversely with slot 16 and will remain in substantially such alignment because the strip guide 37 remains substantially stationary while reel 18 rotates. The purpose of this combined adjustment is to approach as close as possible to the ideal situation wherein the strip S would be unwound in a direction transverse to slot 16 with no bending of the strip around rollers 42, 46, but only line contact therebetween. While the actual path of the strip S will vary from the ideal in proportion to the distance between the point at which the strip S is unwound and the mid-point of the coil, it will readily be seen that this variance is kept as small as possible. Thus, friction between the strip S and the adjacent rollers 42, 46 is reduced to the minimum, thereby avoiding stretching and breaking of the strip.

Secondly, by adjusting slide 80 in ways 79, the reel 18 can readily be located at the proper horizontal distance from feed slot 16. Taken in conjunction with the adjustment of sleeve 49 in sleeve 67 of stand 19 to locate reel 18 at the proper vertical distance from slot 16, the strip S is permitted to twist gradually from rollers 42, 46 for alignment with slot 16 without sagging. In addition, these two adjustments assure a sufficient clearance between the extruder 10 and both strip guide 37 and reel 18.

It will now become evident that once the feeding device 17 is properly set up, the only manual labor necessary is that required to start the strip S feeding into slot 16 and to replace the reels. This is a considerable advance over prior art practice wherein the entire feeding operation must be carried on by hand. This advantage, together with those described above, result in a considerable savings in production costs with a corresponding increase in production rate particularly through the elimination of "down time" caused by breakage and fouling of the strip.

While this invention has been shown and described in a certain preferred form and for a certain preferred purpose, it is to be understood that various changes may be made therein by those skilled in the art without departing from the principles of the invention, the scope of which is to be determined by the appended claims. As by way of example and not as a limitation, the feeding device comprising the invention is not limited to feeding a flat strip to the feed slot of the particular extruder described, but could readily be adapted for feeding a continuous strip of plastic material having any polygonal and/or arcuate cross-section, in solid and/or hollow form, to the intake opening of a suitable article forming apparatus such as an injection molding machine.

Having thus described my invention, what I claim and desire to protect by Letters Patent is:

1. A device for feeding a continuous strip of plastic material to the intake opening of an article forming apparatus, said device comprising a reel for carrying the coiled strip, a stand comprising rotatable reel supporting means, longitudinally adjustable means for locating the reel at the proper vertical distance from the intake opening and angularly adjustable means for locating the axis of the reel at the proper angle between a horizontal and vertical position, means mounted on the reel supporting means for guiding the strip from the reel to the intake opening, said guiding means being mounted for rotation relative to said reel supporting means and to said stand, a base for supporting the stand, and means for adjustably mounting the stand on the base comprising slides movable longitudinally and transversely of the apparatus to locate the reel in the proper alignment with and at the proper horizontal distance from the intake opening.

2. A device for feeding a continuous strip of plastic material to the intake opening of an article forming apparatus, said device comprising a reel for carrying the coiled strip, a stand having rotatable reel supporting means, longitudinally adjustable means for locating the reel at the proper vertical distance from the intake opening and angularly adjustable means for locating the axis of the reel at the proper angle between a horizontal and vertical position, brake means engageable with the reel supporting means for controlling the rotation of the reel to feed the strip to the intake opening at the desired rate, and means mounted on the reel supporting means for guiding the strip from the reel to the intake opening, said guiding means being mounted for rotation relative to said reel supporting means and to said stand.

3. A device for feeding a continuous strip of plastic material to the intake opening of an article forming apparatus, said device comprising a reel for carrying the coiled strip, a stand having rotatable reel supporting means, longitudinally adjustable means for locating the reel at the proper vertical distance from the intake opening and angularly adjustable means for locating the axis of the reel at the proper angle between a horizontal and vertical position, a brake drum mounted on the reel supporting means for rotation therewith and adjustable pressure applying means engageable with the drum for controlling the rotation of the reel to feed the strip to the intake opening at the desired rate, means mounted on the reel supporting means and provided with adjustable arms having rollers alignable with the intake opening for guiding the strip from the reel to the opening, said guiding means being mounted for rotation relative to said reel supporting means and to said stand, a base for supporting the stand, and means for adjustably mounting the stand on the base comprising a longitudinal slide movable in ways on the base extending longitudinally of the apparatus to locate the reel in the proper alignment with the intake opening and a transverse slide attached to the stand and movable in ways on the longitudinal slide extending transversely of the apparatus to locate the reel at the proper horizontal distance from the intake opening.

References Cited in the file of this patent

UNITED STATES PATENTS

| | | |
|---|---|---|
| 1,285,628 | Craley | Nov. 26, 1918 |
| 1,864,267 | Baker et al. | June 21, 1932 |
| 1,873,528 | Anstine | Aug. 23, 1932 |
| 1,908,073 | Spoor et al. | May 9, 1933 |
| 2,012,452 | Littell | Aug. 27, 1935 |
| 2,066,488 | Schmied | Jan. 5, 1937 |
| 2,326,092 | Borton | Aug. 3, 1943 |
| 2,370,048 | Koch | Feb. 20, 1945 |
| 2,572,428 | Anstine | Oct. 23, 1951 |
| 2,625,344 | Flansburgh | Jan. 13, 1953 |
| 2,778,235 | Amonsen | Jan. 22, 1957 |

FOREIGN PATENTS

| | | |
|---|---|---|
| 296,987 | Great Britain | July 11, 1929 |